United States Patent
Warren et al.

(10) Patent No.: US 10,678,118 B2
(45) Date of Patent: Jun. 9, 2020

(54) METHOD AND SYSTEM OF SEALING FRONT HALF OF CAMERA MODULE

(71) Applicant: FLEXTRONICS AP, LLC, San Jose, CA (US)

(72) Inventors: Gary Warren, Aurora (CA); Darren Van Roon, Bowmanville (CA); Reginald C. Grills, Oshawa (CA); Pompilian Tofilescu, Toronto (CA)

(*) Notice: Subject to any disclaimer, the term of this patent is extended or adjusted under 35 U.S.C. 154(b) by 100 days.

(21) Appl. No.: 14/986,367

(22) Filed: Dec. 31, 2015

(65) Prior Publication Data

US 2017/0192340 A1 Jul. 6, 2017

(51) Int. Cl.
| | |
|---|---|
| *G03B 17/08* | (2006.01) |
| *H04N 5/225* | (2006.01) |
| *B29C 65/48* | (2006.01) |
| *F16B 11/00* | (2006.01) |
| *B29L 31/34* | (2006.01) |

(52) U.S. Cl.
CPC .......... *G03B 17/08* (2013.01); *B29C 65/4835* (2013.01); *B29C 65/4845* (2013.01); *H04N 5/2252* (2013.01); *H04N 5/2253* (2013.01); *H04N 5/2254* (2013.01); *B29L 2031/3425* (2013.01)

(58) Field of Classification Search
CPC .... H04N 5/2252; H04N 5/2253; G03B 17/08; B29C 65/4845; B29C 65/4835
See application file for complete search history.

(56) References Cited

U.S. PATENT DOCUMENTS

| | | | | |
|---|---|---|---|---|
| 6,178,016 | B1* | 1/2001 | Ashe | H04N 1/03 358/487 |
| 2005/0152125 | A1* | 7/2005 | Fukuda | H05B 33/04 362/84 |
| 2006/0292377 | A1* | 12/2006 | Hoffman | B29C 66/43 428/414 |
| 2009/0295985 | A1* | 12/2009 | Nakamura | H04N 5/2252 348/373 |
| 2010/0054812 | A1* | 3/2010 | Matsuura | G03B 27/54 399/177 |
| 2012/0133825 | A1* | 5/2012 | Nakajima | H04N 5/2253 348/374 |
| 2014/0198212 | A1* | 7/2014 | Lin | H04N 5/2252 348/148 |

* cited by examiner

*Primary Examiner* — Christopher K Peterson

(57) ABSTRACT

A method and apparatus for sealing components of a front half camera module subassembly is described herein. The camera may be used in an automotive camera, which includes but is not limited to automotive rear-view cameras. A glue bead seal may be applied to the front half camera housing to which a camera lens may be attached. Then a glue bead seal may be applied to the other side of the front half camera housing to which a printed circuit board (PCB) is attached. As a result, the seals protect the lens inside optical surface and image sensor located between the camera lens and PCB from the outside environment. The lens inside optical surface and image sensor and PCB may be tested, calibrated, or have other assembly sequences completed outside of a clean room. Alignment of the PCB and lens inside optical surface and image sensor is also secured.

10 Claims, 7 Drawing Sheets

METHOD AND SYSTEM OF SEALING FRONT HALF OF CAMERA MODULE

FIELD OF INVENTION

The present disclosure relates generally to camera for use in automotive applications including but not limited to rear-view cameras, and more particularly to methods and apparatus for sealing the front half of a camera.

BACKGROUND

There has been a proliferation of the application camera technology in consumer devices such as cellular phones and computing devices. Automobiles manufacturers have also increasingly included cameras as a standard or optional feature for benefits including but not limited to enhancing vehicle safety, improving vehicle maneuverability, and providing convenience to the vehicle driver. Due to a rear-view camera's ability to prevent back over accidents and thereby reduce fatalities and serious injuries caused by those accidents, the National Highway Traffic Safety Administration (NHTSA) will require all new vehicles under 10,000 pounds to include rear visibility technology by May 2018. Accordingly, there is a need for cost effective designs for rear visibility technology in order to comply with NHTSA regulations.

Engineers designing cameras for use in visibility technology design the camera to be as small as possible. They also aim to minimize cost and design ways to easily test and calibrate the camera. In a clean room, the camera lens typically is installed into the camera module and then a printed circuit board (PCB) is screwed to the camera module thereby attaching it to the lens as well. This method of attachment may allow the PCB to shift and leave the lens unprotected, which may also result in the lens and imager falling out of alignment. This method also may allow small particles of contamination and light into the area where the lens inside optical surface and image sensor is located. Furthermore, the subassembly including the lens, PCB, and image sensor can only be tested, calibrated, or have other assembly sequences completed in a clean room. Accordingly, there is a need for methods and apparatus for sealing the front half of a camera.

SUMMARY

A method and apparatus for sealing components of a sealing a front half camera module subassembly is described herein. The camera may be used in an automotive camera, which includes but is not limited to automotive rear-view cameras. A seal may be created by running a glue bead around the component or component to be sealed. One embodiment includes sealing a printed circuit board (PCB) and a camera lens to the camera housing, creating a sealed subassembly which can be tested, calibrated, and handled outside of a clean room. The seal may be used to protect the lens inside optical surface and image sensor once the camera lens and the PCB are attached.

In one embodiment, a glue bead seal may be applied to the front half camera housing to which a camera lens may be attached. Then a glue bead seal may be applied to the other side of the front half camera housing to which a PCB is attached. As a result, the seals protect the lens inside optical surface and image sensor located between the camera lens and PCB from the outside environment. Also because of the seals, the lens inside optical surface and image sensor and PCB may be tested, calibrated, or have other assembly sequences completed outside of a clean room. This also results in securing alignment of the PCB and lens inside optical surface and image sensor.

DETAILED DESCRIPTION OF THE PREFERRED EMBODIMENTS

Figure 1:
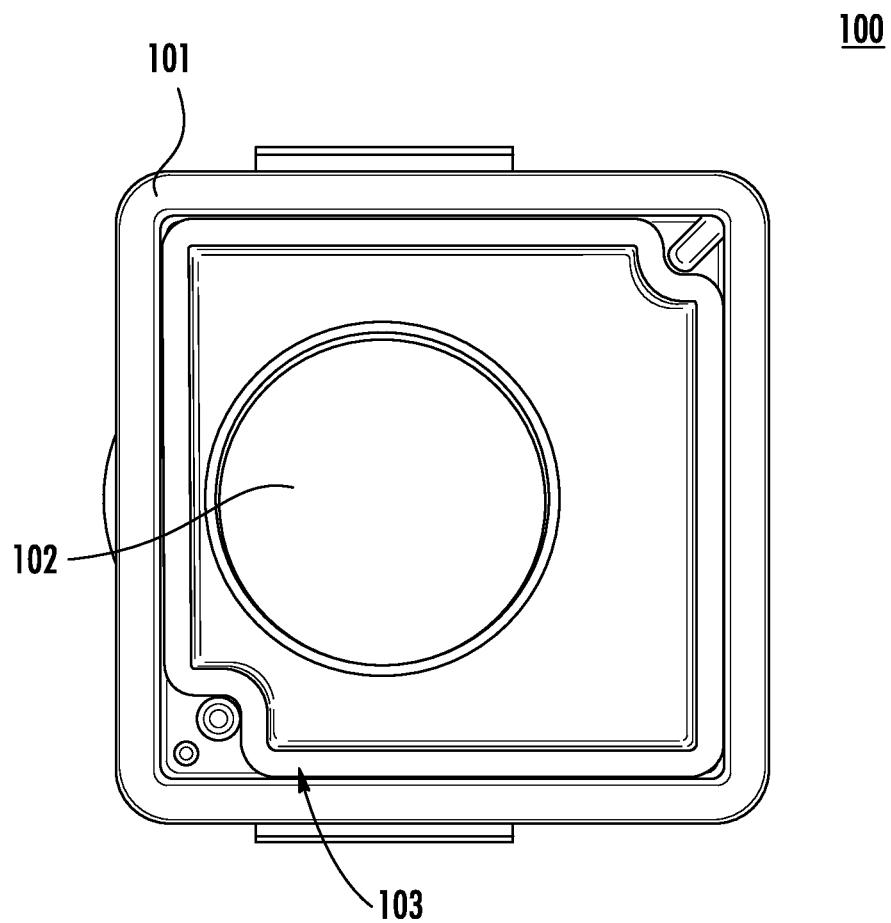
FIG. 1 is a diagram of a front half camera module subassembly that is sealed in accordance with one embodiment.

Described herein are methods and apparatuses for sealing a front half camera module subassembly, which may be used in an automotive camera, which includes but is not limited to automotive rear-view cameras. A seal may be created by running a glue bead around the component or component to be sealed. One embodiment includes sealing a printed circuit board (PCB) and a camera lens to the camera housing, creating a sealed subassembly which can be tested, calibrated, and handled outside of a clean room. The seal may be used to protect the lens inside optical surface and image sensor once the camera lens and the PCB are attached.

In one embodiment, a glue bead seal may be applied to the front half camera housing to which a camera lens may be attached. Then a glue bead seal may be applied to the other side of the front half camera housing to which a PCB attached. As a result, the seals protect the lens inside optical surface and image sensor located between the camera lens and PCB from the outside environment. Also because of the seals, the lens inside optical surface and image sensor and PCB may be tested, calibrated, or have other assembly sequences completed outside of a clean room. This also results in securing alignment of the PCB and lens inside optical surface and image sensor. Alternatively, the PCB may be glued to the camera housing prior to gluing the camera lens.

It is to be understood that the figures and descriptions of embodiments for sealing the front half of a camera module have been simplified to illustrate elements that are relevant for a clear understanding, while eliminating, for the purpose of clarity, many other elements found in typical camera production processes. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The embodiments described herein are not intended to be exhaustive or limiting in any manner and are provided by way of example.

The non-limiting embodiments described herein are with respect to a system and method for sealing the front half of a camera module. Other electronic devices, modules and applications may also be used in view of these teachings without deviating from the spirit or scope as described herein. The systems and methods described herein may be modified for a variety of applications and uses while remaining within the spirit and scope of the claims. The embodiments and variations described herein, and/or shown in the drawings, are presented by way of example only and are not limiting as to the scope and spirit. The descriptions herein may be applicable to all embodiments of the sealed front half of a camera module although it may be described with respect to a particular embodiment.

FIG. 1 is a diagram of a front half camera module subassembly 100 shown after the camera lens is glued and sealed, but before a PCB is attached for illustration purposes, in accordance with one embodiment. Alternatively, the assembly order may include the PCB glued and sealed first. The example of FIG. 1 includes the front half camera housing 101 and lens 102. A glue bead 103 is also shown, which may be run along the entire perimeter of the front half camera housing 101. The glue bead 103 may be composed of ultra violet (UV) light cured waterproof glue.

Figure 2:
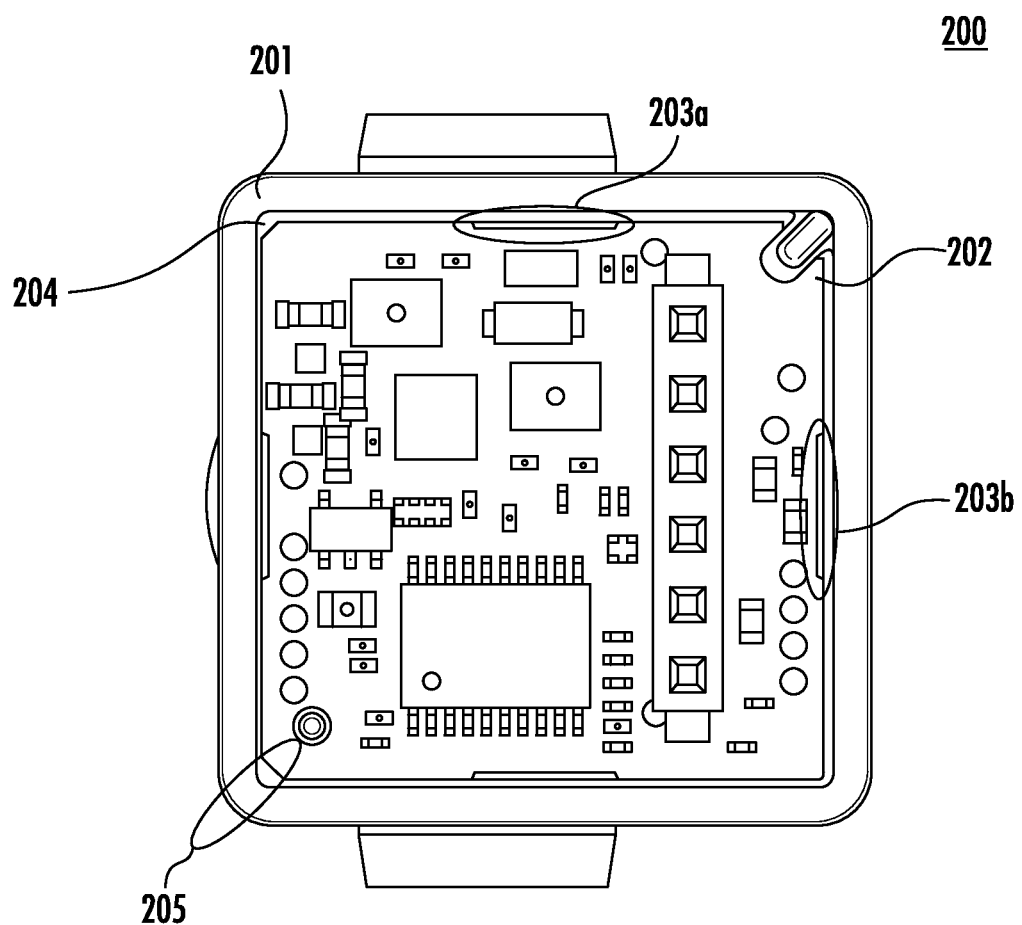
FIG. 2 is a diagram of another view of a front half camera module subassembly that is sealed in accordance with another embodiment.

FIG. 2 is a diagram of another view of a front half camera module subassembly 200 that is sealed in accordance with another embodiment. The example of FIG. 2 includes the front half camera housing 201 and PCB 202. The lens is in place behind PCB 202. Openings 203a and 203b between the PCB 202 and the front half camera housing 201 are also shown, which may allow ultraviolet (UV) light to tack the PCB temporarily in place. The remainder of the glue bead 204 is cured later with heat. The glue bead 204 may be of various sizes and be composed of various glue types including but not limited to UV light cured waterproof, heat cured waterproof, and UV light and heat cured waterproof glues. The shape and configuration of openings 203a and 203b are for exemplary purposes only and may be implemented in other shapes and/or configurations. Because the glue bead 204 is on the non-visible side of the front half camera module 200, the openings 203a and 203b allow UV light to access the glue bead 204, which would otherwise be inaccessible to light to enable initial glue curing initial glue curing and to tack the PCB in place. The glue bead 204, which has been run along the entire perimeter of the PCB 202 in the front half camera housing 201, attaches the PCB 202 to the front half camera housing 201. As a result, a seal 205 is created between the PCB 202 and lens resulting in a cavity between the PCB 202 and lens that is completely sealed off, which protects the lens inside an optical surface and image sensor. Accordingly, the lens inside optical surface and image sensor is completely protected from the surrounding environment on account of the seal 205. As a result, the sealed lens and PCB 202 may be handled in a production environment outside of a clean room.

Additionally, there may be a pressure relief vent hole in the PCB 202, or front half camera housing 201 that can be sealed after the glue beads have been fully heat cured. The pressure relief vent hole may prevent any increase in air pressure build up in the enclosed areas that is caused by the heat used to cure the glue and therefore prevent any increase in distance between the lens and the PCB or other structural problem that would negatively affect the focus of the lens in the final cured glue condition. The pressure relief hole may maintain the optimal focus distance. The pressure relief hole may then be sealed with glue and cured to completely seal the front chamber.

Figure 3A:
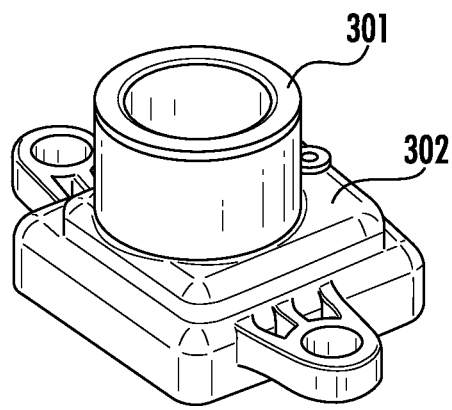
FIG. 3A is another diagram of a front half camera module subassembly that has been sealed in accordance with any of the embodiments described herein.

FIG. 3A is a diagram of a front half camera module subassembly 300 to which glue is applied in accordance with any of the embodiments described herein. The example of FIG. 3A shows glue bead 301 applied to the front half camera housing 302.

Figure 3B:
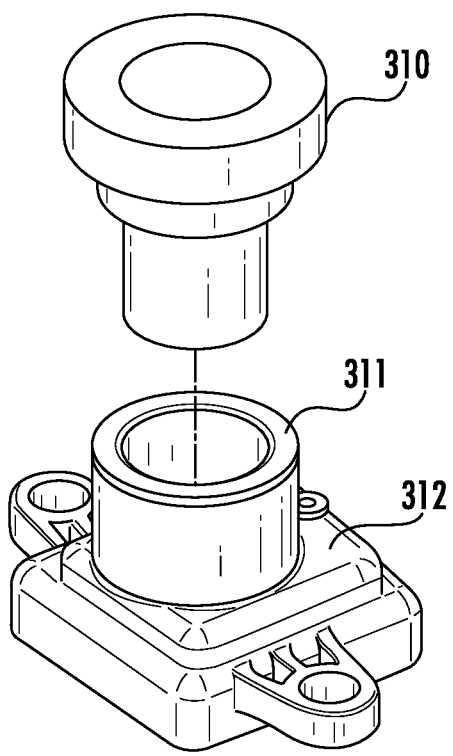
FIG. 3B is another diagram of a front half camera module subassembly that has been sealed in accordance with any of the embodiments described herein.

FIG. 3B is a diagram of a front half camera module subassembly 300 that has been sealed in accordance with any of the embodiments described herein. The example of FIG. 3B shows glue bead 311 applied to the front half camera housing 312 and the lens 310 prior to attachment.

Figure 3C:
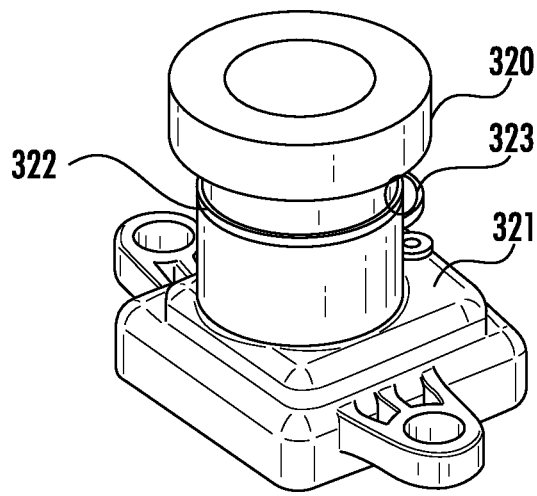
FIG. 3C is another diagram of a front half camera module subassembly that has been sealed in accordance with any of the embodiments described herein.

FIG. 3C is a diagram of a front half camera module subassembly 300 that has been sealed in accordance with any of the embodiments described herein. The example of FIG. 3C includes the lens 320 that has been attached to the front half camera housing 321. As shown in the example of FIG. 3C, a glue bead 322 has been run along the front half camera housing 321 creating a seal 323 that protects the lens inside optical surface and image sensor within the front half camera module subassembly 300. As a result of the seal 323, the front half camera module subassembly 300, which includes a lens inside optical surface and image sensor and PCB is completely protected from the surrounding environment. As a result, the sealed front half camera subassembly 300 may be handled in a production environment outside of a clean room. Also, the sealed front half camera module subassembly 300 may be calibrated via a software program outside of a clean room. Furthermore, the sealed front half camera module subassembly 300 may be tested via testing software outside of a clean room.

Figure 4A:
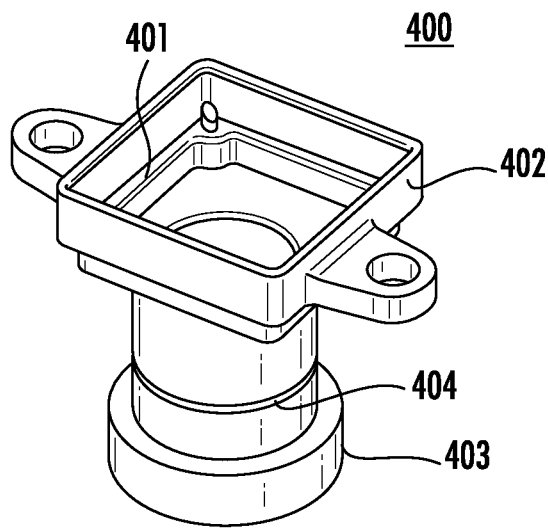
FIG. 4A is another diagram of a front half camera module subassembly that has been sealed in accordance with any of the embodiments described herein.

FIG. 4A is a diagram of a front half camera module subassembly 400 to which glue is applied in accordance with any of the embodiments described herein. The example of FIG. 4A shows glue bead 401 applied to the front half camera housing 402. Also visible is the lens 403 and glue bead seal 404 attaching the lens 403.

Figure 4B:
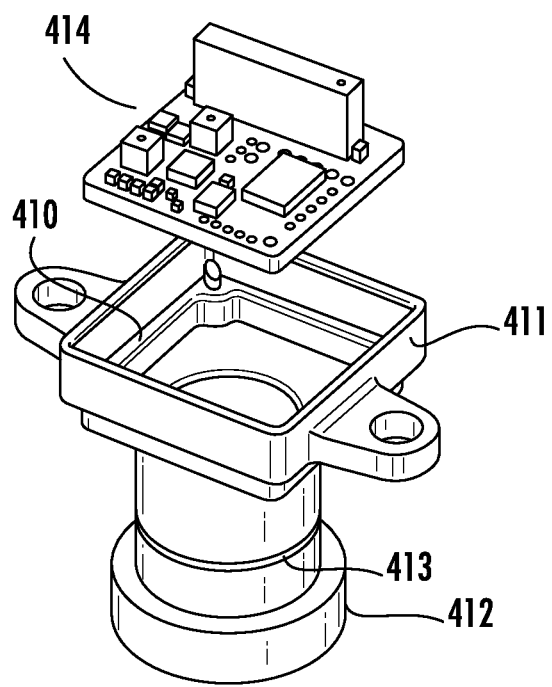
FIG. 4B is another diagram of a front half camera module subassembly that has been sealed in accordance with any of the embodiments described herein.

FIG. 4B is a diagram of a front half camera module subassembly 400 that has been sealed in accordance with any of the embodiments described herein. The example of FIG. 4B shows glue bead 410 applied to the front half camera housing 411. The PCB 414 will come into contact with the glue bead 410 when assembled into the front half camera housing 411. Alternatively, the glue bead 410 could be applied to both the front half camera housing 411 and PCB 414. Also visible is the lens 412 and glue bead seal 413 attaching the lens 412. As described above, in an alternative embodiment, the PCB may be glued to the front half camera housing prior to the lens.

Figure 4C:
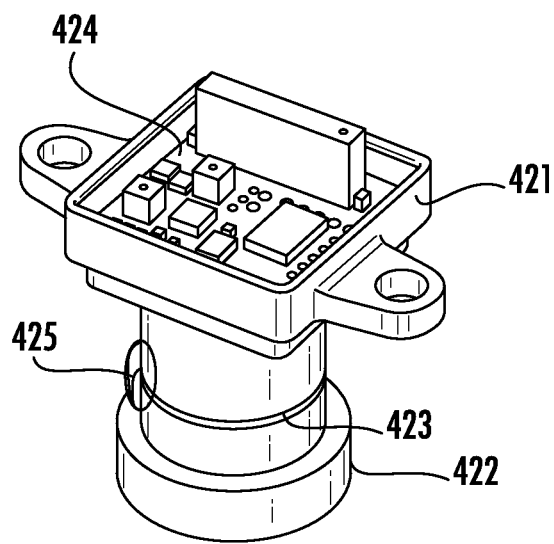
FIG. 4C is another diagram of a front half camera module subassembly that has been sealed in accordance with any of the embodiments described herein.

FIG. 4C is another diagram of a front half camera module subassembly 400 that has been sealed in accordance with any of the embodiments described herein. The example of FIG. 4C includes the lens 422 that has been attached to the front half camera housing 421. As shown in the example of FIG. 4C, glue bead 423 has been run along the front half camera housing 421 creating a seal 425 that protects the lens inside optical surface and image sensor within the front half camera module subassembly 400. As a result of the seal 425, the front half camera module subassembly 400, which includes a lens inside optical surface and image sensor between PCB 424 and lens 422 is completely protected from the surrounding environment. As a result, the sealed front half camera subassembly 400 may be handled in a production environment outside of a clean room. Also, the sealed front half camera module subassembly 400 may be calibrated via a software program outside of a clean room. Furthermore, the sealed front half camera module subassembly 400 may be tested via testing software outside of a clean room.

Figure 5:
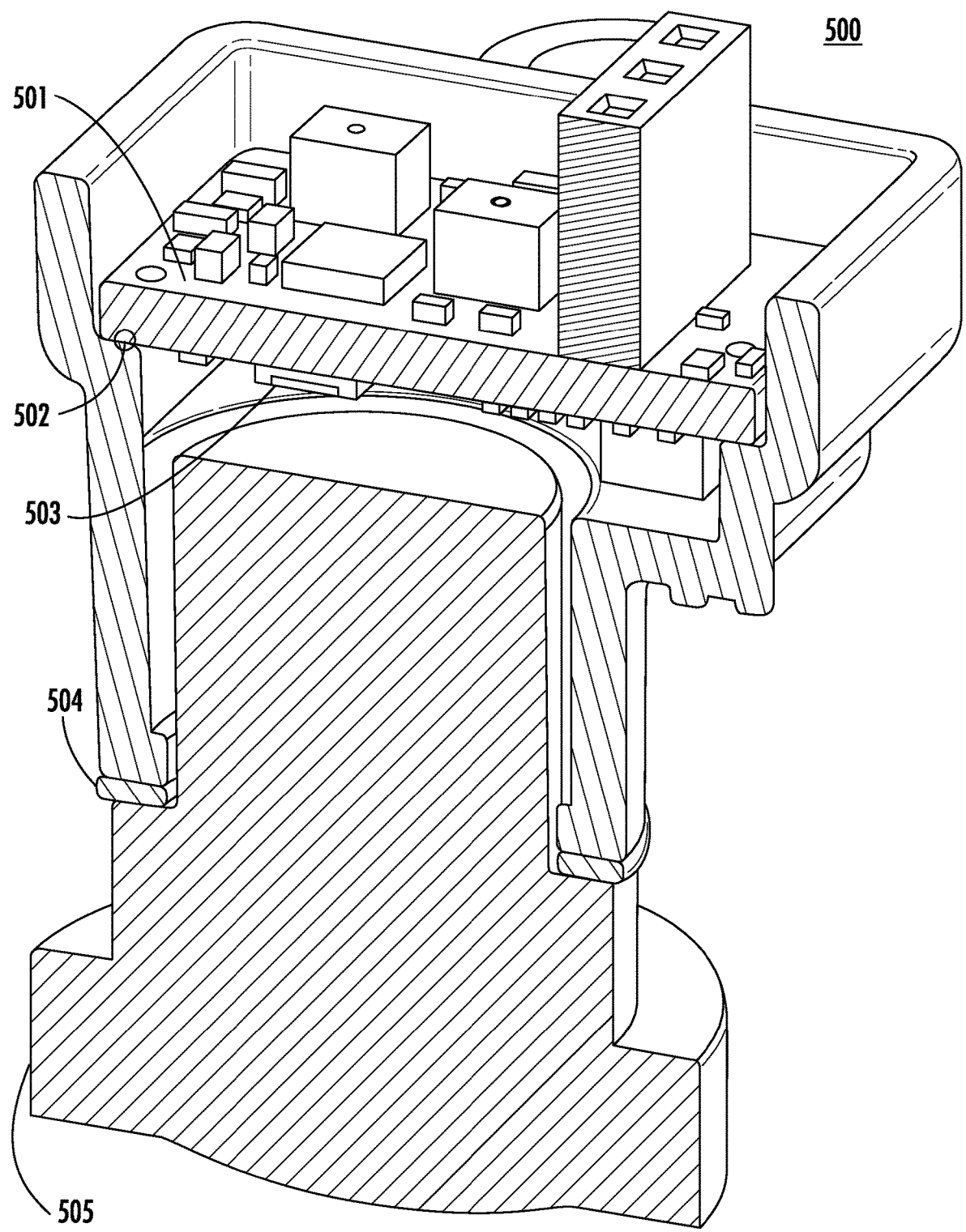
FIG. 5 is another diagram of a front half camera module subassembly that is sealed in accordance with one embodiment.

FIG. 5 is a diagram of another view of a front half camera module subassembly 500 that has been sealed in accordance with any of the embodiments described herein. The example of FIG. 5 includes PCB 501 and the PCB to front half camera housing seal 502. Also shown are the lens 505 and lens to front half camera housing seal 504. In the sealed cavity between the lens 505 and PCB 501 is the lens inside optical surface and image sensor 503. As a result of this sealed cavity the lens inside optical surface and image sensor 503 is protected and may be tested, calibrated, or have other assembly sequences completed outside of a clean room.

Figure 6A:
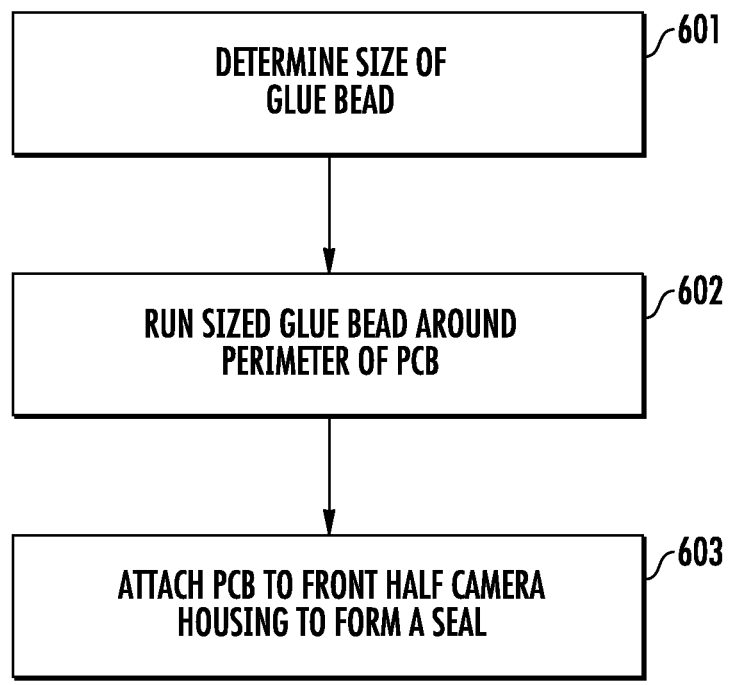
FIG. 6A is a flow diagram of a method for attaching a PCB to the front half of the camera module housing.
Figure 6B:
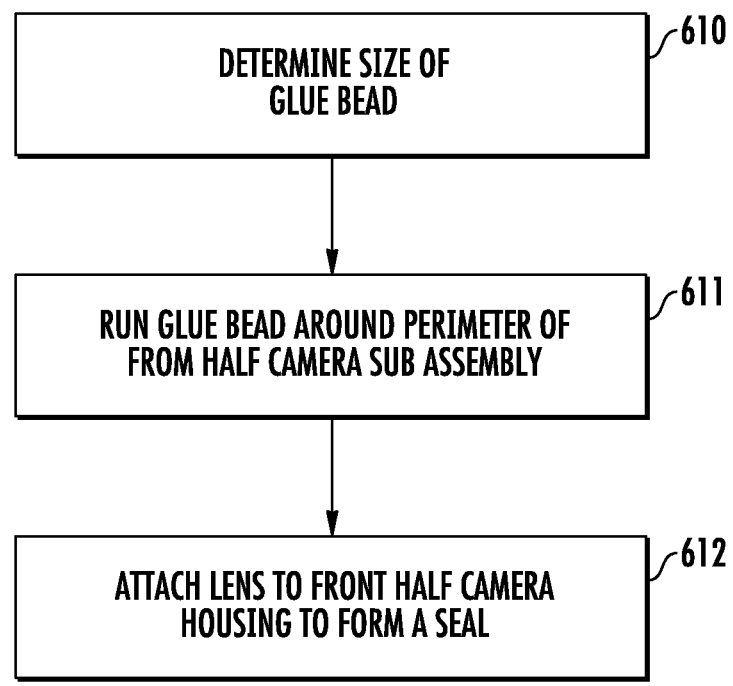
FIG. 6B, shows an example method for attaching the front half camera subassembly to the back half camera housing.

FIGS. 6A-6B are flow diagrams of an example method for sealing the front half of a camera, which may be used, for example, in an automotive camera. FIG. 6A shows an example method 600 for attaching a PCB to the front half camera housing, which results in creating a seal that protects the lens. Referring to FIG. 6A, at step 601, the size of the glue bead to be used to create a seal between a PCB and a front half camera housing is determined. At step 602, the determined glue bead size may be run around the perimeter of the PCB. At step 603, the PCB is attached to the front half camera housing to create a seal that protects the lens inside optical surface and image sensor from the surrounding environment.

FIG. 6B, shows an example method for attaching the front half camera subassembly to the back half camera housing, which results in creating a seal that protects the lens. Referring to FIG. 6B, at step 610, the size of the glue bead to be used to create a seal between the front half camera subassembly and the back half camera housing is determined. At step 612, the determined glue bead size may be run around the perimeter of the front half camera subassembly that contains the lens. At step 613, the front half camera subassembly is attached to the back half camera housing to create a seal that protects the lens inside optical surface and image sensor from the surrounding environment.

As described herein, the methods described herein are not limited to any particular element(s) that perform(s) any particular function(s) and some steps of the methods presented need not necessarily occur in the order shown. For example, in some cases two or more method steps may occur in a different order or simultaneously. In addition, some steps of the described methods may be optional (even if not explicitly stated to be optional) and, therefore, may be omitted. These and other variations of the methods disclosed herein will be readily apparent, especially in view of the description of the systems described herein, and are considered to be within the full scope of the invention.

Although features and elements are described above in particular combinations, each feature or element can be used alone without the other features and elements or in various combinations with or without other features and elements.

What is claimed is:

1. A method for sealing a front half camera module subassembly, the method comprising:
applying a first glue bead in a continuous line around an entire perimeter of a first surface of a front half camera housing without any interruption along the perimeter;
attaching a lens to the first surface of the front half camera housing via the first glue bead to create a first seal;
applying a second glue bead in a continuous line around the entire perimeter of a second surface of the front half camera housing without any interruption along the perimeter; and
attaching a printed circuit board (PCB) to the second surface of the front half camera housing via the second glue bead to create a second seal,
wherein the first seal and the second seal create a sealed cavity between the PCB and the lens that protects a lens inside optical surface and an image sensor located within the sealed cavity from an outside environment, and
the attaching the PCB to the front half camera housing via the second glue bead forms a plurality of openings between the PCB and the front half camera housing, the plurality of openings are configured to expose a portion of the second glue bead to ultraviolet (UV) light to enable initial glue curing to tack the PCB to the second surface while maintaining the integrity of the sealed cavity.

2. The method of claim 1, wherein the first glue bead and second glue bead are composed of ultra violet (UV) light cured waterproof glue.

3. The method of claim 1, wherein the first glue bead and second glue bead are composed of heat cured waterproof glue.

4. The method of claim 1, wherein the first glue bead and second glue bead are composed of ultra violet (UV) light and heat cured waterproof glue.

5. The method of claim 1, wherein the camera module is associated with an automotive rear-view camera.

6. A sealed front half camera module subassembly comprising:
a first glue bead applied in a continuous line around an entire perimeter of a first surface of a front half camera housing without any interruption along the perimeter;
a lens attached to the front half camera housing via the first glue bead forming a first seal;
a second glue bead applied in a continuous line around the entire perimeter of a second surface of the front half camera housing; and
a printed circuit board (PCB) attached to the second surface of the front half camera housing via the second glue bead forming a second seal,
wherein the first seal and the second seal form a sealed cavity between the PCB and the lens that protects a lens inside optical surface and an image sensor located within the sealed cavity of the front half camera module subassembly from an outside environment, and
the PCB attached to the front half camera housing via the second glue bead forms a plurality of openings between the PCB and the front half camera housing, the plurality of openings are configured to expose a portion of the second glue bead to ultraviolet (UV) light to enable initial glue curing to tack the PCB to the second surface while maintaining the integrity of the sealed cavity.

7. The sealed front half camera module subassembly of claim 6, wherein the first glue bead and second glue bead are composed of ultra violet (UV) light cured waterproof glue.

8. The sealed front half camera module subassembly of claim 6, wherein the first glue bead and second glue bead are composed of heat cured waterproof glue.

9. The sealed front half camera module subassembly of claim 6, wherein the first glue bead and second glue bead are composed of ultra violet (UV) light and heat cured waterproof glue.

10. The sealed front half camera module subassembly of claim 6, wherein the camera module is associated with an automotive rear-view camera.

* * * * *